United States Patent
Ozawa et al.

(10) Patent No.: US 9,251,444 B2
(45) Date of Patent: Feb. 2, 2016

(54) IMAGE FORMING APPARATUS, NON-TRANSITORY COMPUTER-READABLE STORAGE MEDIUM AND PRINT CONTROL METHOD

(71) Applicant: Konica Minolta, Inc., Chiyoda-ku (JP)

(72) Inventors: Masahiro Ozawa, Hino (JP); Mitsuharu Hayasaka, Suginami-ku (JP); Takahisa Matsunaga, Hino (JP); Hiroshi Nogawa, Hachioji (JP); Yasufumi Aoyama, Hachioji (JP); Kunikazu Satou, Tama (JP); Tetsuren Ri, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/305,355

(22) Filed: Jun. 16, 2014

(65) Prior Publication Data

US 2014/0376019 A1 Dec. 25, 2014

(30) Foreign Application Priority Data

Jun. 19, 2013 (JP) .................... 2013-128064

(51) Int. Cl.
 G06K 15/02 (2006.01)
 G06K 15/00 (2006.01)
(52) U.S. Cl.
 CPC .......... *G06K 15/1813* (2013.01); *G06K 15/005* (2013.01); *G06K 15/1849* (2013.01); *G06K 15/1822* (2013.01)
(58) Field of Classification Search
 None
 See application file for complete search history.

(56) References Cited

U.S. PATENT DOCUMENTS

2004/0169886 A1* 9/2004 Mitani .................... 358/1.16
2005/0200887 A1   9/2005 Bai
(Continued)

FOREIGN PATENT DOCUMENTS

JP    5-298310 A    11/1993
JP    2004-272536 A    9/2004
(Continued)

OTHER PUBLICATIONS

Japanese Notification of Reasons for Refusal dated May 26, 2015 issued in the corresponding Japanese Patent Application No. 2013-128064 and English translation (6 pages).
(Continued)

*Primary Examiner* — Benny Q Tieu
*Assistant Examiner* — Haris Sabah
(74) *Attorney, Agent, or Firm* — Buchanan Ingersoll & Rooney PC

(57) ABSTRACT

Provided are an image forming apparatus, a non-transitory computer-readable storage medium storing a control program, and a print control method. An image forming apparatus which can directly print printing data described in a page description language. The image forming apparatus includes a display section, a data receiving section, an analyzing section and a rasterizing section. The analyzing section is configured to analyze printing data to determine a file format of the printing data, and operate the display section to display a print setup screen thereon, where the print setup screen depends on the file format of the printing data. The analyzing section is further configured to define a layout of objects in each page to be printed and convert the printing data into descriptions of an intermediate language. The rasterizing section is configured to rasterize the descriptions of the intermediate language to create an image to be printed.

12 Claims, 16 Drawing Sheets

(56) References Cited

U.S. PATENT DOCUMENTS

| | | |
|---|---|---|
| 2007/0041040 A1 | 2/2007 | Ozawa |
| 2008/0266604 A1* | 10/2008 | Kuroki et al. ............ 358/1.16 |
| 2009/0021762 A1* | 1/2009 | Saito ........................ 358/1.13 |
| 2011/0075166 A1* | 3/2011 | Goldwater et al. ........ 358/1.9 |

FOREIGN PATENT DOCUMENTS

| | | |
|---|---|---|
| JP | 2005-157413 A | 6/2005 |
| JP | 2005-258669 A | 9/2005 |
| JP | 2007-050649 A | 3/2007 |
| JP | 2010-140122 A | 6/2010 |
| JP | 2010-187117 A | 8/2010 |
| JP | 2011-118818 A | 6/2011 |
| JP | 2012-008991 A | 1/2012 |
| JP | 2013-067034 A | 4/2013 |

OTHER PUBLICATIONS

Japanese Decision of Refusal dated Nov. 6, 2015 issued in the corresponding Japanese Patent Application No. 2013-128064 and English translation (6 pages).

* cited by examiner

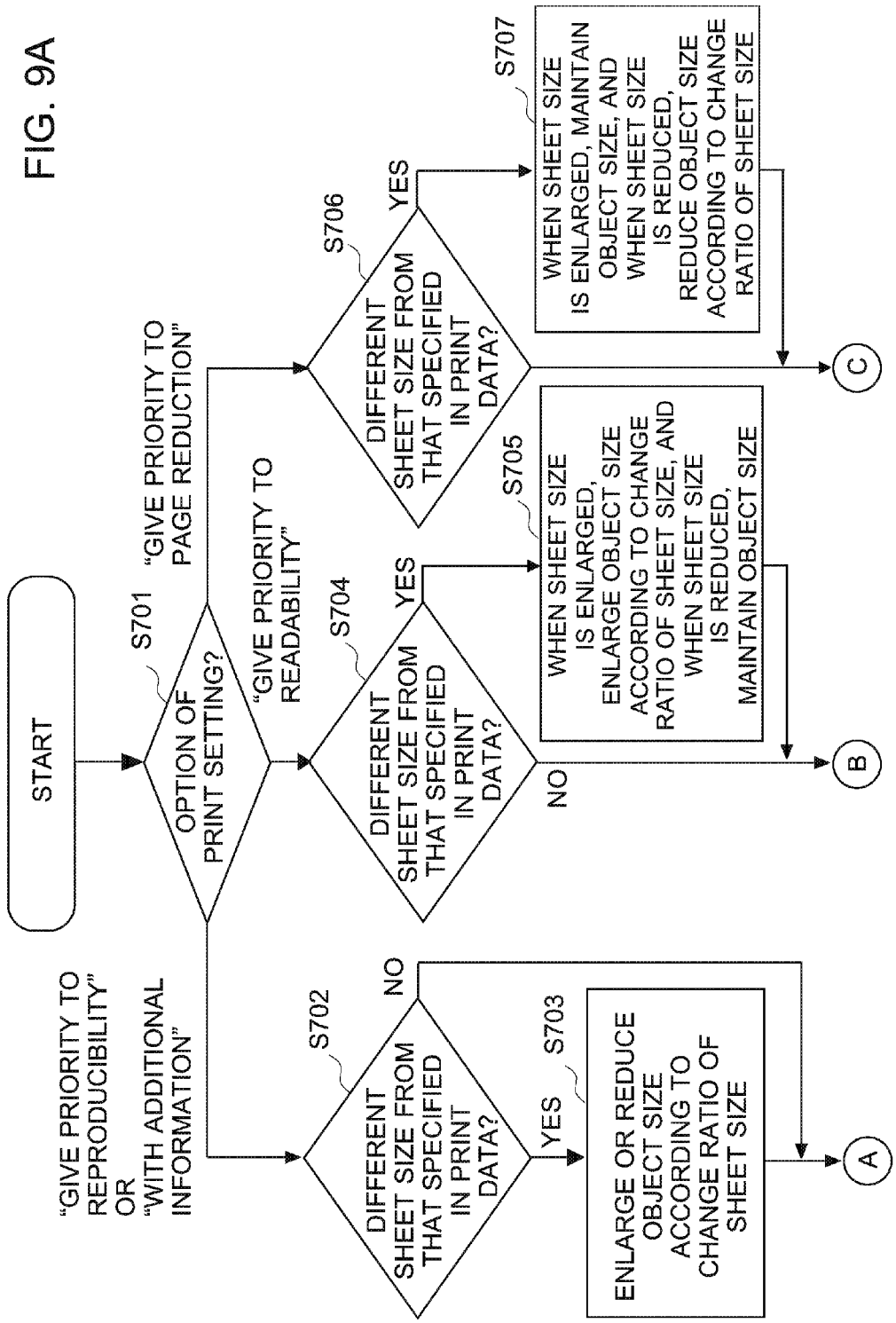

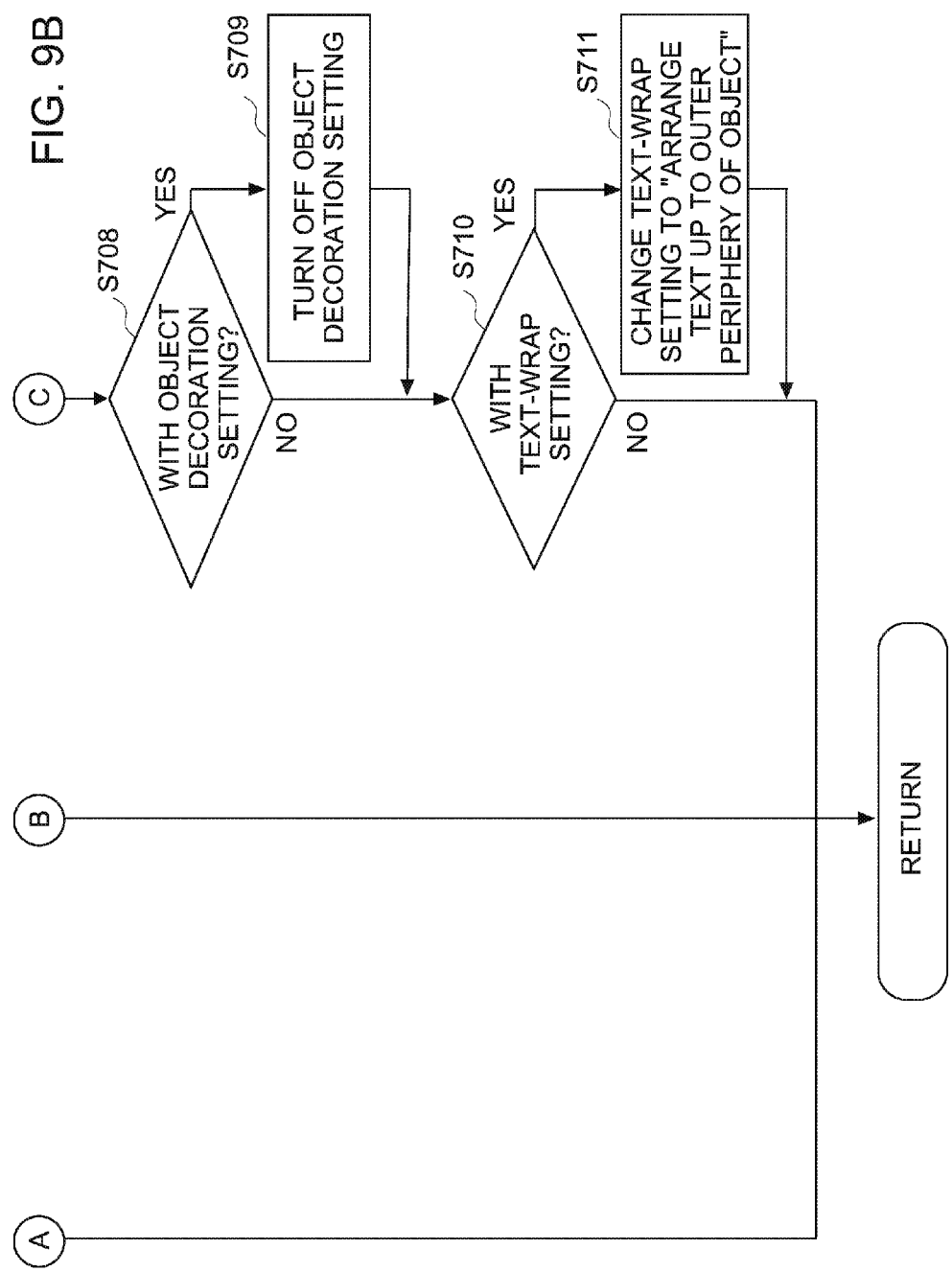

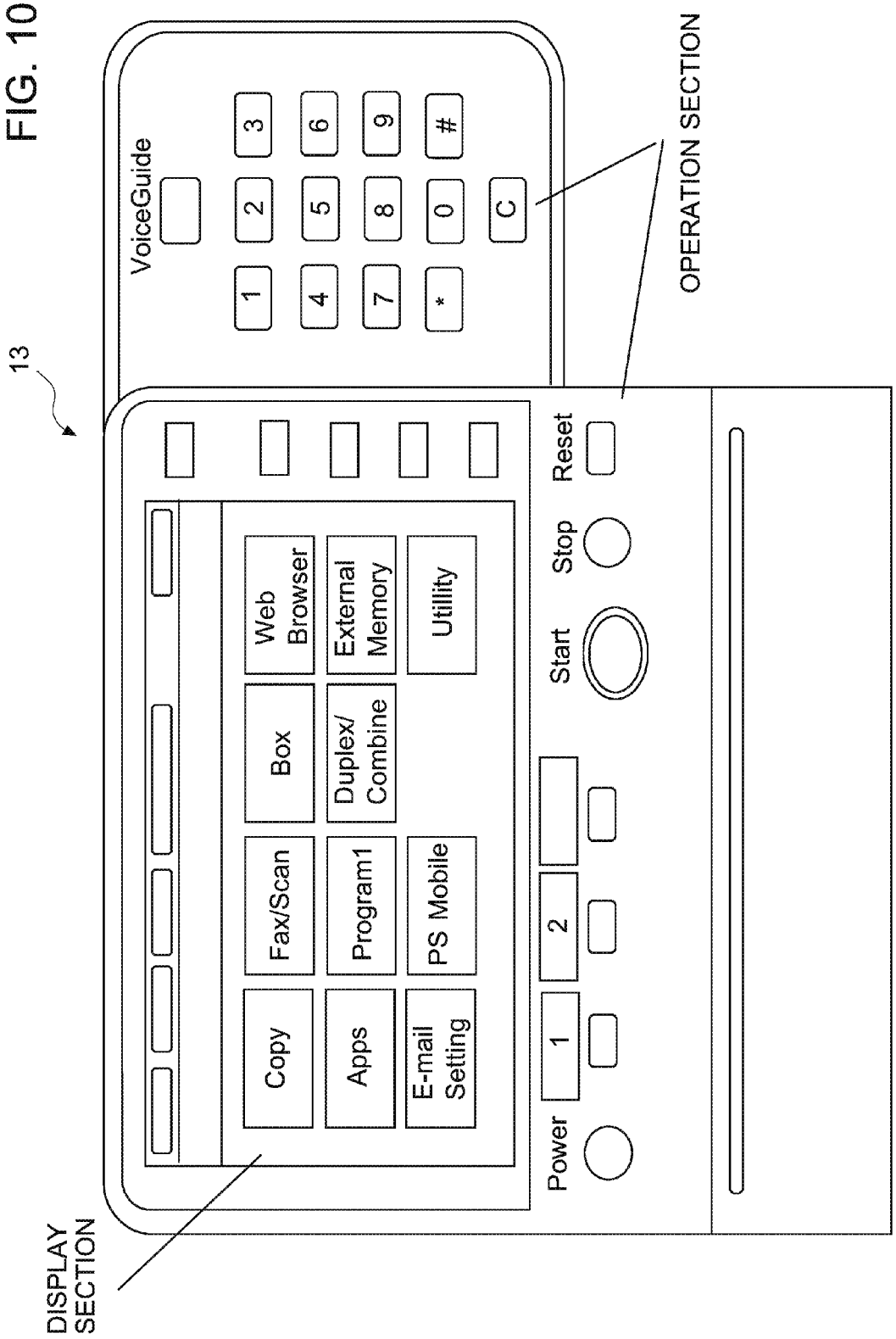

FIG. 13A

Compact and stylish design
With its sophisticated black-and-white body and space-saving design, this product is in harmony with any office.

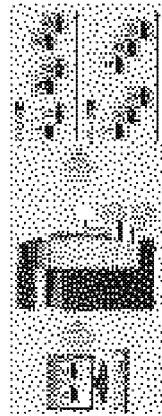
40

Cables are covered in the rear, creating a flat back and sides.
It looks smart almost anywhere — even in the center of the office.

Mobile functions
Connection with various cloud service is available with the application which allows users to print documents, Web pages and images from tablet terminals and smartphones directly to the product or to store documents scanned on the products into the mobile devices.
The application provides secure mobile printing by supporting the authentication function of the product.

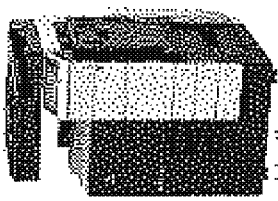

FIG. 13B

Carbon copy printing
Carbon copy printing allows you to automatically print the same data on different kinds of paper by changing the paper source.
You can easily prepare materials for immediate distribution and those for filing with carbon copy printing, outputting the same data continuously from multiple paper trays in different paper weight or colors - for example, fine quality colored paper in tray 1 for immediate distribution and recycled paper in tray 2 and tray 3 for filing.
Two types of sorting option, sorting by page and sorting by tray are available for carbon copy printing.

FIG. 14B

Carbon copy printing

Carbon copy printing allows you to automatically print the same data on different kinds of paper by changing the paper source.
You can easily prepare materials for immediate distribution and those for filing with carbon copy printing, outputting the same data continuously from multiple paper trays in different paper weight or colors - for example, fine quality colored paper in tray 1 for immediate distribution and recycled paper in tray 2 and tray 3 for filing.
Two types of sorting option, sorting by page and sorting by tray are available for carbon copy printing.

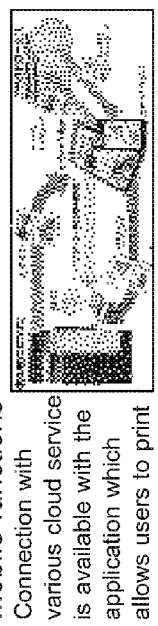

FIG. 14A

Compact and stylish design

With its sophisticated black-and-white body and space-saving design, this product is in harmony with any office.

Cables are covered in the rear, creating a flat back and sides.
It looks smart almost anywhere — even in the center of the office.

Mobile functions

Connection with various cloud service is available with the application which allows users to print 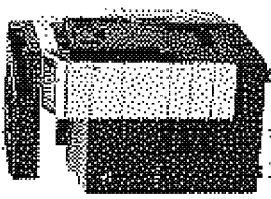 documents, Web pages and images from tablet terminals and smartphones directly to the product or to store documents scanned on the products into the mobile devices.
The application provides secure mobile printing by supporting the authentication function of the product.

FIG. 14D

Carbon copy printing

Carbon copy printing allows you to automatically print the same data on different kinds of paper by changing the paper source.
You can easily prepare materials for immediate distribution and those for filing with carbon copy printing, outputting the same data continuously from multiple paper trays in different paper weight or colors - for example, fine quality colored paper in tray 1 for immediate distribution and recycled paper in tray 2 and tray 3 for filing.
Two types of sorting option, sorting by page and sorting by tray are available for carbon copy printing.

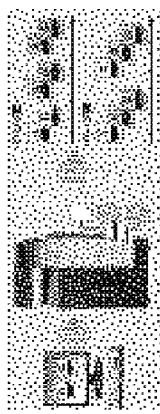

FIG. 14C

Compact and stylish design

With its sophisticated black-and-white body and space-saving design, this product is in harmony with any office.

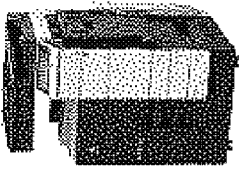

Cables are covered in the rear, creating a flat back and sides.
It looks smart almost anywhere -- even in the center of the office.

Mobile functions
Connection with various cloud service is available with the application which allows users to print documents, Web pages and images from tablet terminals and smartphones directly to the product or to store documents scanned on the products into the mobile devices.
The application provides secure mobile printing by supporting the authentication function of the product.

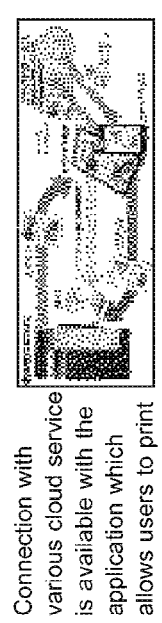

FIG. 15A

Compact and stylish design

With its sophisticated black-and-white body and space-saving design, this product is in harmony with any office.

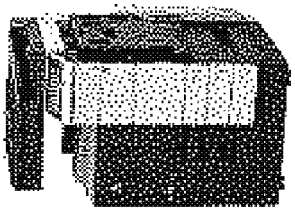

Cables are covered in the rear, creating a flat back and sides.
It looks smart almost anywhere — even in the center of the office.

FIG. 15B

Mobile functions

Carbon copy printing allows you to automatically print the same data on different kinds of paper by changing the paper source.
You can easily prepare materials for immediate distribution and those for filing with carbon copy printing, outputting the same data continuously from multiple paper trays in different paper weight or colors - for example, fine quality colored paper in tray 1 for immediate distribution and recycled paper in tray 2 and tray 3 for filing.
Two types of sorting option, sorting by page and sorting by tray are available for carbon copy printing.

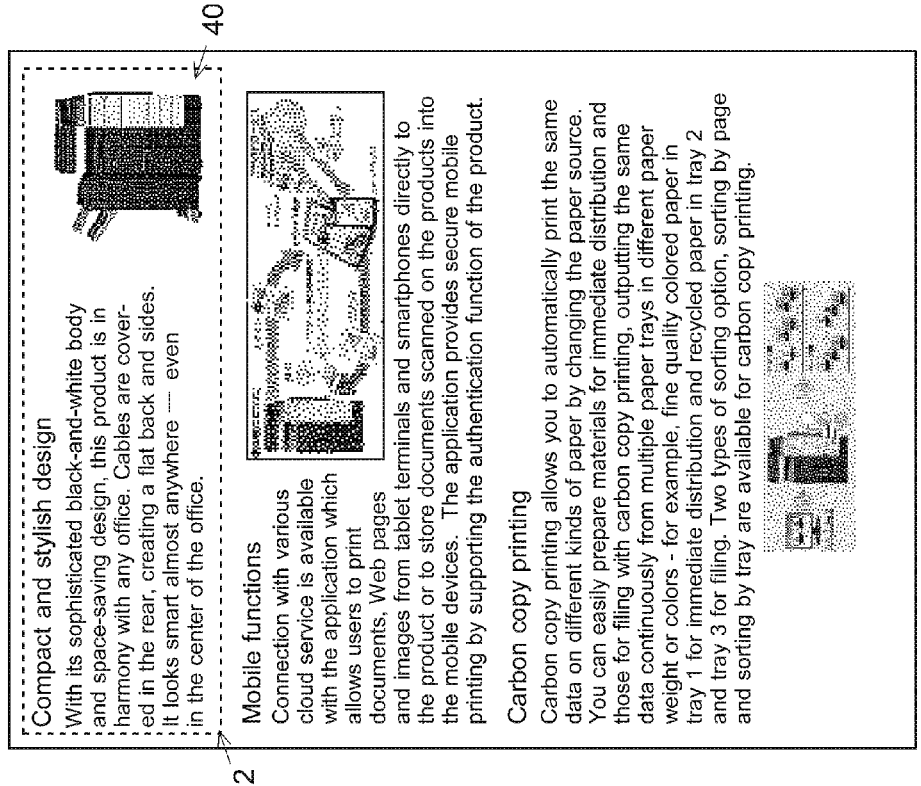

Carbon copy printing

Carbon copy printing allows you to automatically print the same data on different kinds of paper by changing the paper source. You can easily prepare materials for immediate distribution and those for filing with carbon copy printing, outputting the same data continuously from multiple paper trays in different paper weight or colors - for example, fine quality colored paper in tray 1 for immediate distribution and recycled paper in tray 2 and tray 3 for filing. Two types of sorting option, sorting by page and sorting by tray are available for carbon copy printing.

FIG. 16

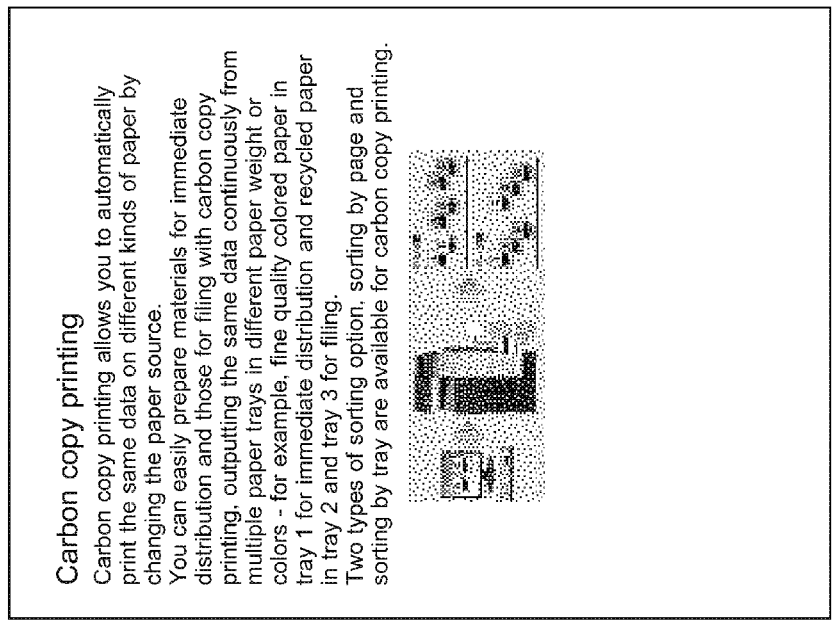

Compact and stylish design
With its sophisticated black-and-white body and space-saving design, this product is in harmony with any office. Cables are covered in the rear, creating a flat back and sides. It looks smart almost anywhere — even in the center of the office.

Mobile functions
Connection with various cloud service is available with the application which allows users to print documents, Web pages and images from tablet terminals and smartphones directly to the product or to store documents scanned on the products into the mobile devices. The application provides secure mobile printing by supporting the authentication function of the product.

Carbon copy printing
Carbon copy printing allows you to automatically print the same data on different kinds of paper by changing the paper source. You can easily prepare materials for immediate distribution and those for filing with carbon copy printing, outputting the same data continuously from multiple paper trays in different paper weight or colors - for example, fine quality colored paper in tray 1 for immediate distribution and recycled paper in tray 2 and tray 3 for filing. Two types of sorting option, sorting by page and sorting by tray are available for carbon copy printing.

FIG. 17A

Compact and stylish design

With its sophisticated black-and-white body and space-saving design, this product is in harmony with any office.

Cables are covered in the rear, creating a flat back and sides.
It looks smart almost anywhere -- even in the center of the office.

Mobile functions

Connection with various cloud service is availablewith 
the application which allows users to print documents, Web pages and images from tablet terminals and smartphones directly to theproduct or to store documents scanned on the products into the mobile devices.
The application provides secure mobile printing by supporting the authentication function of the product.

Available File Format:
PDF,
Compact PDF,
JPEG,
TIFF,
XPS,
Compact XPS,
OpenXML

Carbon copy printing

Carbon copy printing allows you to automatically print the same data on different kinds of paper by changing the paper source. You can easily prepare materials for immediate distribution and those for filing with carbon copy printing, outputting the same data continuously from multiple paper trays in different paper weight or colors - for example, fine quality colored paper in tray 1 for immediate distribution and recycled paper in tray 2 and tray 3 for filing. Two types of sorting option, sorting by page and sorting by tray are available for carbon copy printing.

IMAGE FORMING APPARATUS, NON-TRANSITORY COMPUTER-READABLE STORAGE MEDIUM AND PRINT CONTROL METHOD

This application is based on Japanese Patent Application No. 2013-128064 filed on Jun. 19, 2013, in the Japan Patent Office, the entire content of which is hereby incorporated by reference.

TECHNICAL FIELD

The present invention relates to an image forming apparatus, a non-transitory computer-readable medium storing a print control program, and a print control method. In particular, the present invention relates to an image forming apparatus capable of performing direct printing, a non-transitory computer-readable medium storing a print control program for controlling settings for direct printing, and a print control method of controlling settings for direct printing.

BACKGROUND

Components of an office software suite, each capable of performing various processing such as document preparation and spreadsheet calculation, have been generally used now in various scenes, for example, for work, school and home. As typical components of an office software suite, there can be cited Microsoft Word (Trademark), Microsoft Excel (Trademark) and Microsoft PowerPoint (Trademark) of Microsoft Corporation (Trademark). Further, a plurality of office software suites and their components having similar functions, such as Apache OpenOffice, have also been distributed. Standardization for Microsoft Excel and Apache OpenOffice serving as an open source has been completed by a standardization organization, and the specification of each of formats: OOXML (Office Open XML) and ODF (OpenDocument Format) has been opened to public. Further, a number of compatible applications which support the above formats have been distributed.

Further, in recent years, with the spreading of cloud computing, the number of online storage services which offer display and edit functions supporting files (referred to as office suite files) created by applications as components of office software suites, and the number of smartphones and tablet terminals which have display and edit functions supporting the office suite files have been also increased rapidly. Furthermore, also in the MFP (Multi-Function Peripheral) and printer market, devices supporting direct printing of office suite files have been released.

With regard to layout processing in printing of such an office suite file, for example, Japanese Laid-Open Patent Application Publication (JP-A) No. 2012-008991 discloses a technique to implement several actions with VBA. In accordance with the technique, at the time a user clicks a print button, page settings are defined such that text and other objects in a print range are accommodated in a single sheet of a selected print size. Further, in the case where multiple sheets are included in a single file of Microsoft Excel, at the time a user clicks a print button, printing of all the sheets can be also performed.

Furthermore, JP-A No. H05-298310 discloses a simplified printing method of a word processor, though it is not a technique relating to office suite files but relates to a layout processing in printing. The simplified printing method is to be used for pages of a document in the middle of proofreading by using a word processor. The word processor includes an input section to input data for document preparation; a display section to display the data input from the input section on a screen; a layout section to recognize the input data as a format in units of a page; a print section to print a document; a control section to control comprehensively the display section, the layout section, and the print section; and a function section to make the control section start a simplified printing process as one function of the input section.

Moreover, with regard to printing of a PDF (Portable Document Format) file, JP-A No. 2005-157413 discloses a printer which can receive electronic document data from a data processing apparatus or and performs a printing process. The printer includes a judging section to judge whether the electronic document data include font data; and a print control section. The print control section is configured as follows. In response to judging that the received data is data of electronic document in which data of fonts is embedded, based on the judgment result by the judging section, the print control section selects one of the embedded font data and font data of the printer based on the font use condition in the electronic document data, and performs printing.

In the case where a user instructs a MFP about printing by using an application as components of office software suites, such as Microsoft Word, Microsoft Excel and Microsoft PowerPoint, the user may adjust detailed print settings while confirming a preview of a print result (a result of printing) indicated on a display of a computer. On the other hand, in the case where a user directly instructs a MFP about printing (direct printing), since the size of a panel of a MFP is small, it is difficult for the user to adjust print settings while previewing a print result on the panel. Accordingly, the kinds of print settings which can be adjusted by the user are limited to those regarding restrictive and simple functions, which is a problem.

With regard to the problem in this direct printing, description is given based on comparison between a case of using files based on OOXML as printing data and a case of using files described in a conventional print languages.

In the case of direct printing using files described in the conventional print languages (PDF, XPS, MEG, TIFF, etc.), a user has previously defined print settings by use of an application for the direct printing on a computer, or has defined print settings on a panel of a MFP or a printer. Such print languages or electronic files are based on a concept of pages, which comes from the specification of each file format, and strictly specifies therein the sizes and coordinate positions of objects included in each page. Accordingly, the output result is fixed uniquely.

On the other hand, in a file based on OOXML, the coordinate position of each object is not specified, which comes from the specification of the file format, and the layout of objects to be printed depends on a layout engine of an application to create a print image. Further, the file includes objects depending on settings of a drawing engine, such as date, currency units, color, etc., and objects to be calculated at the time of creating a print image, such as functional calculus and filtering processes.

Accordingly, when reduction or shift has been instructed for a file described in a conventional print language, it is enough that the whole page, whose print image has been created by using a fixed layout, is just reduced or shifted uniformly, which allows a user to adjust print settings as intended without previewing a print result. However, as for a file based on OOXML, change of a printing condition affects a layout of objects. Accordingly, in conventional direct printing, a user has hardly adjusted print settings as intended without previewing a print result.

In other words, in the conventional direct printing of printing data of a specific file format as with OOXML, in which the arrangement of objects in each page is not specified, there has been a problem that a user has hardly adjusted print settings as intended by a user so that a desired print result may not be obtained. The present invention seeks to solve the problem.

SUMMARY

There are disclosed illustrative image forming apparatuses, non-transitory computer-readable storage media each storing a print control program, and print control methods.

An illustrative image forming apparatus reflecting one aspect of the present invention is an image forming apparatus which can directly print printing data described in a page description language. The image forming apparatus comprises: a display section; a data receiving section configured to receive the printing data; an analyzing section; and a rasterizing section. The analyzing section is configured to analyze the printing data to determine a file format of the printing data, and operate the display section to display a print setup screen thereon, where the print setup screen depends on whether the printing data has a predetermined file format or not. The analyzing section is further configured to define a layout of objects in each page to be printed from the printing data, according to a print setting or print settings set on the print setup screen, and convert the printing data into descriptions of an intermediate language, based on the layout. The rasterizing section is configured to rasterize the descriptions of the intermediate language to create an image to be printed.

A non-transitory computer-readable medium reflecting one aspect of the present invention stores a print control program to be executed in an apparatus configured to directly print printing data described in a page description language or to send another apparatus an instruction to directly print the printing data. The control program, when being executed by a processor of the apparatus, causes the processor to perform the following processes. The processes comprises: in response to the printing data being received, analyzing the printing data to determine a file format of the printing data; operating a display section of the apparatus to display a print setup screen thereon, where the print setup screen depends on whether the printing data has a predetermined file format or not; and defining a layout of objects in each page to be printed from the printing data, according to a print setting or print settings set on the print setup screen.

An illustrative print control method reflecting one aspect of the present invention is a print control method of an apparatus configured to directly print printing data described in a page description language or to send another apparatus an instruction to directly print the printing data. The method comprises: receiving the printing data; analyzing the printing data to determine a file format of the printing data; and operating the display section to display a print setup screen thereon, where the print setup screen depends on whether the printing data has a predetermined file format or not. The method further comprises defining a layout of objects in each page to be printed from the printing data, according to a print setting or print settings set on the print setup screen; and converting the printing data into descriptions of an intermediate language, based on the layout; and rasterizing the descriptions of the intermediate language to create an image to be printed.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which:

FIGS. 9A and 9B illustrate a flowchart of a direct printing process (process of changing object property in the process of analyzing printing data) of the image forming apparatus according to the one embodiment of the present invention;

FIG. 10 is a diagram illustrating an outer appearance constitution of a display and operation section of the image forming apparatus according to the one embodiment of the present invention;

FIGS. 13A and 13B are diagrams illustrating one example of original printing data;

FIGS. 14A to 14D are diagram illustrating one example of a print result at the time of reproducibility to be prioritized;

FIGS. 15A to 15C are diagrams illustrating one example of a print result at the time of readability to be prioritized;

FIG. 16 is a diagram illustrating one example of a print result at the time of reduction of the number of pages to be prioritized; and FIGS. 17A and 17B are diagrams illustrating one example of a print result at the time that there is additional information.

DETAILED DESCRIPTION

Figure 1:
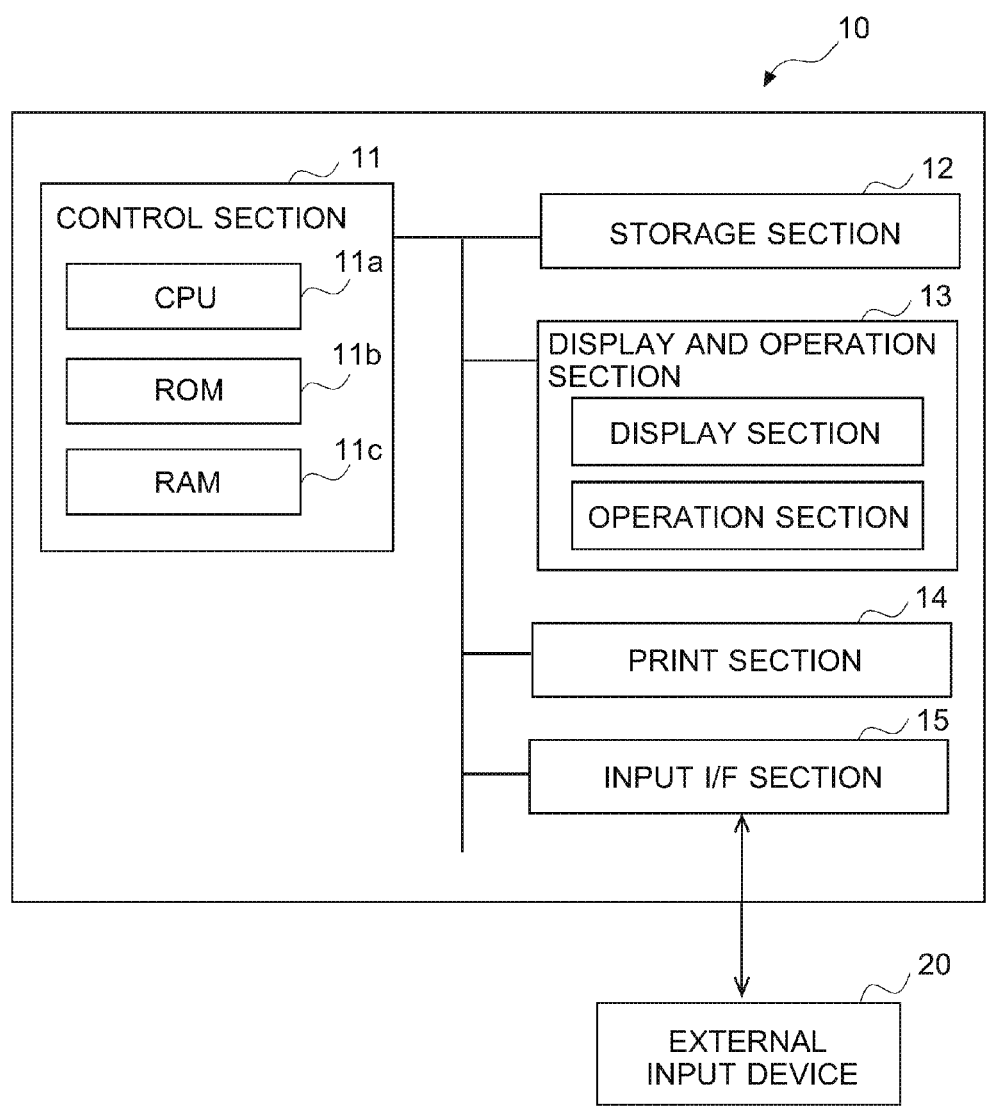
FIG. 1 is a block diagram illustrating a constitution of an image forming apparatus according to one embodiment of the present invention.

Illustrative embodiments of image forming apparatuses, non-transitory computer-readable storage media each storing a display control program and display control methods will be described with reference to the drawings. It will be appreciated by those of ordinary skill in the art that the description given herein with respect to those figures is for exemplary purposes only and is not intended in any way to limit the scope of potential embodiments may be resolved by referring to the appended claims.

According to image forming apparatuses, non-transitory computer-readable storage media each storing a display control program and display control methods as embodiment of the present invention, it is possible to obtain a print result as intended by a user even in the case where direct printing is performed for printing data of a specific file format in which the arrangement of objects in each page is not specified.

The reason is that such the image forming apparatus can perform control (by executing the print control program thereon) as follows. In the case where direct printing is instructed by a user, the image forming apparatus analyzes printing data being the target of the direct printing to determine the file format of the printing data; and operates a display section to display a print setup screen, where the display setup screen changes depending on whether the printing data has a predetermined file format or not. In the case where the printing data has the predetermined file format, the image forming apparatus operates the display section to display a print setup screen which allows a user to choose a standard for defining the layout of objects in each page to be printed, prompts a user to choose the standard, and defines the layout of the objects according to the chosen standard.

As described in the descriptions about the background, in the case where a user instructs a MFP or printer about printing by using an application, such as Microsoft Word, Microsoft Excel and Microsoft PowerPoint, the user can adjust detailed print settings while confirming a preview of a print result indicated on a display of a computing device. However, in the case where a user performs direct printing (that is, directly instructs a MFP or printer about printing), the user hardly adjusts detailed print settings while previewing a print result on a panel of a MFP. In particular, in the case that a user specifies reduction or shift at the time of an instruction of direct printing for printing data described in a conventional print language, it may be permissible that reduction or shift is applied uniformly onto the whole page, which allows a user to adjust print settings as intended without previewing a print result. On the other hand, in conventional direct printing for printing data having a specific file format, such as OOXML, in which the arrangement of objects in each page is not specified, change of a printing condition affects the layout of the objects, which has made a user difficult to adjust print settings as intended without previewing a print result.

In view of the above, in an embodiment of the present invention, there is provided a control by which, when performing direct printing for printing data having a specific file format on a MFP or a printer, which is an image forming apparatus capable of directly printing of printing data described in a page description language, a user can obtain a desired print result without previewing a print result. In more concrete terms, the control includes analyzing printing data as the target of direct printing to determine its file format and operating a display section to display a print setup screen, where the print setup screen is changed depending on whether the printing data has a predetermined file format such as OOXML, in which the layout of objects in each page to be printed is not specified. The control further includes, in the case where the printing data has the predetermined file format, operating the display section to display a print setup screen which allows a user to choose one of standards for defining the layout of objects in each page (giving priority to readability, reduction of the number of pages and others) to prompt the user to choose the standard, and defining the layout of the objects according to the chosen standard.

Here, the control of the embodiments and example to be described below relates to a page printer which can create bitmap data of each page be printed, and a MFP which has the equivalent print function, and the control is applicable to direct printing of printing data of OOXML, which is a file format supported in applications on and after Microsoft Word 2007, Microsoft Excel 2007, and Microsoft PowerPoint 2007 contained in the office suite of Microsoft Corporation. Further, the control is also applicable to direct printing of printing data of ODF which is a file format similar to OOXML.

EXAMPLES

Figure 2:
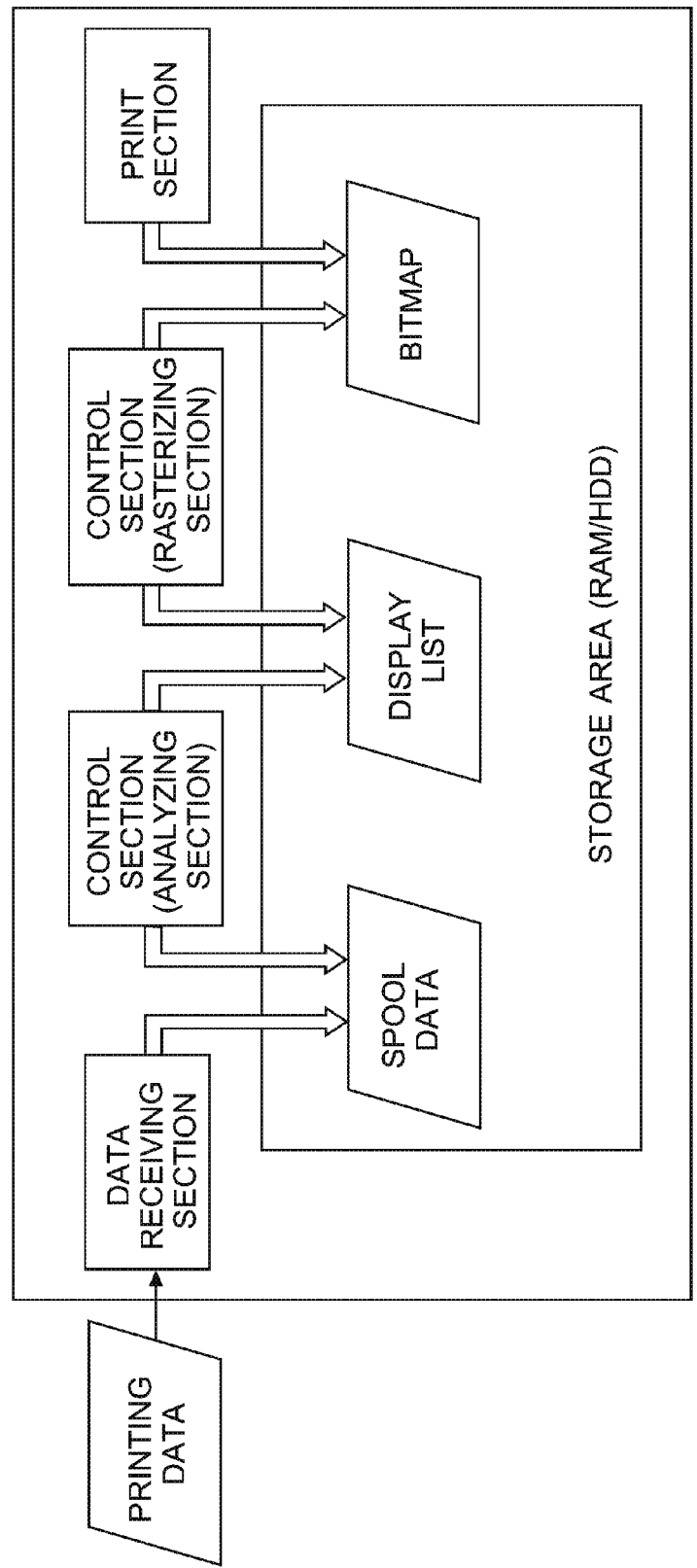
FIG. 2 is a diagram illustrating an outline of a direct printing process of the image forming apparatus according to one embodiment of the present invention.
Figure 11:
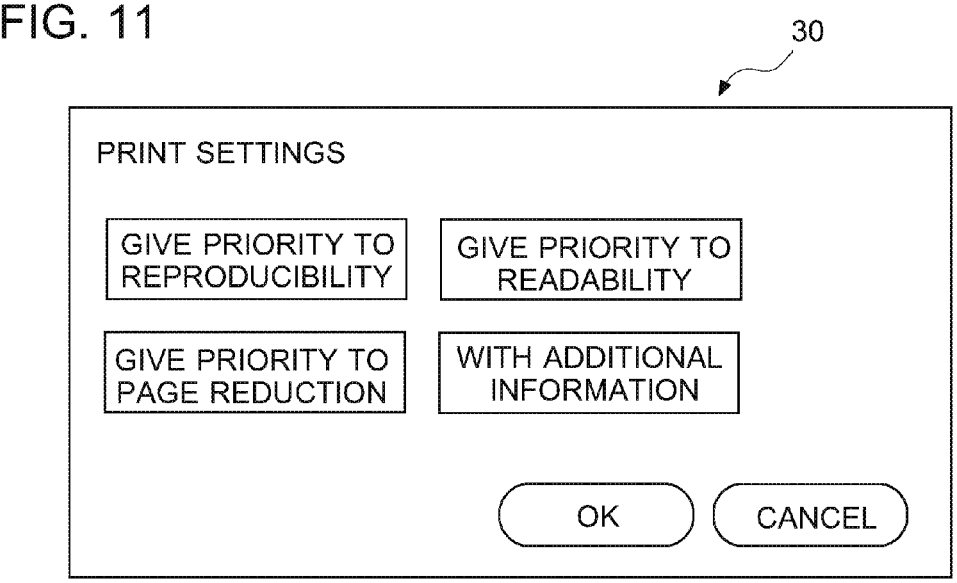
FIG. 11 is a diagram illustrating one example of a print setup screen displayed on the display and operation section of the image forming apparatus according to the one embodiment of the present invention.
Figure 12:
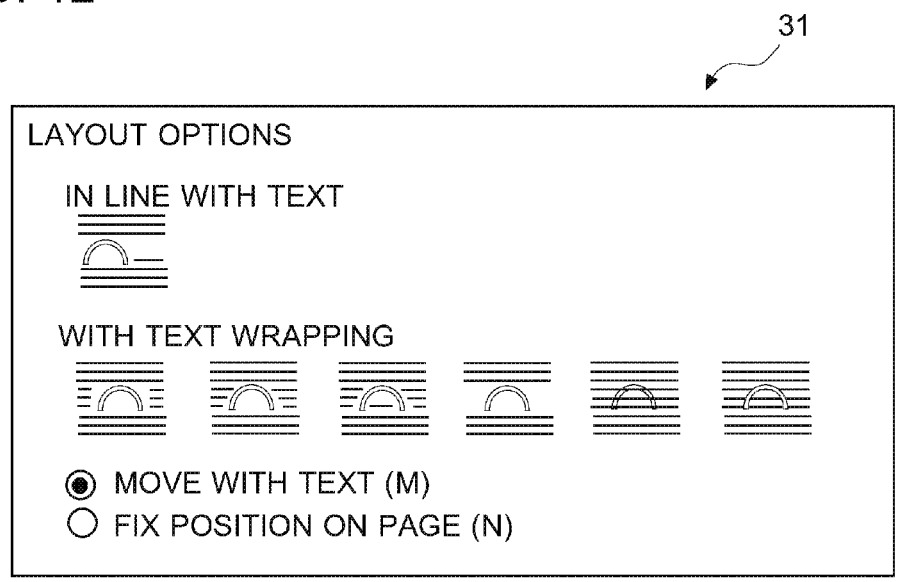
FIG. 12 is a diagram illustrating one example of a layout option screen displayed on the display and operation section of the image forming apparatus according to the one embodiment of the present invention.

In order to describe in detail about the above-mentioned embodiments, description is given to an illustrative image forming apparatus, an illustrative non-transitory computer readable medium storing a print control program, and an illustrative print control method with reference to FIGS. 1 to 17B. FIG. 1 is a block diagram illustrating a constitution of an image forming apparatus of the present example, and FIG. 2 is a diagram illustrating an outline of a direct printing process of the image forming apparatus. Further, FIGS. 3 to 9B are flowcharts illustrating the direct printing process of the image forming apparatus of the present example, and FIG. 10 is a diagram illustrating an outer appearance constitution of a display and operation section of the image forming apparatus. Furthermore, each of FIGS. 11 and 12 is a diagram illustrating one example of screens displayed on the display and operation section of the image forming apparatus, FIGS. 13A and 13B are diagrams illustrating one example of original printing data, and each of FIGS. 14A to 14D, FIGS. 15A to 15C, FIG. 16 and FIGS. 17A and 17B are diagrams illustrating one example of a print result at the time of performing print control of the present example.

The image forming apparatus of the present example can be a page printer which creates a print image of each page or a printing device which has the equivalent print function, and as illustrated in FIG. 1. The image forming apparatus includes a control section 11, a storage section 12, a display and operation section 13, a print section 14 and an input I/F (interface) section 15.

The control section 11 includes a CPU (Central Processing Unit) 11a and memories, such as a ROM (Read Only Memory) 11b and a RAM (Random Access Memory) 11c. The CPU 11a is configured to read out various programs from the ROM 11b or the storage section 12, develop them into the RAM 11c, and execute them. Further, the ROM 11b stores the programs etc. to be executed by the CPU 11a, and the RAM 11c stores the results of arithmetic processing of the CPU 11a.

The control section 11 is configured to also work as a data receiving section, an analyzing section, and a rasterizing section by executing the control program memorized in the ROM 11b or the storage section 12. The data receiving section is configured to receive printing data described in PDL (Page Description Language) from an external input device 20 through the input I/F section 15. The analyzing section is configured to analyze printing data, to determine whether the printing data is data having a predetermined file format (for example, OOXML, ODF, etc.), or data of a usual file format (for example, PDF, and XML Paper Specification known as XPS), and to operate the display and operation section 13 (display section) to display one of different print setup screens (GUI: Graphical User Interface), where the print setup screen to be displayed depends on whether the printing data has the predetermined file format or not. Successively, the analyzing section is configured to, according to print setting or print settings set on the print setup screen, define the layout of objects of each page to be printed and convert the printing data into descriptions of a intermediate language, to create a display list (DL: Display List). The rasterizing section is configured to rasterize each page to create image data (print image) for each page, conduct image processing (processing, such as color adjustment, image density adjustment, size adjustment) and screening on the image data if needed, and convert the image data into image data capable of being printed at the print section 14. Here, the data receiving section, the analyzing section, and the rasterizing section may be constituted as hardware, or may be realized by executing a print control program to cause the control section 11 to work as those sections (in particular, as the analyzing section).

The storage section 12 includes a HDD (Hard Disk Drive), a SSD (Solid State Drive), and the like, and is configured to memorize programs, printing data, additional font, and image data processed by the control section 11 (rasterizing section).

The display and operation section 13 can be a touch panel including a display section such as a liquid crystal display unit and an operation section of a pressure sensing type or an electrostatic capacity type, where the operation section is provided with transparent electrodes arranged in the form of a lattice on the display section. The display and operation section 13 is configured to display a screen to operate the image forming apparatus 10 and a print setup screen corresponding to a file format, and to allow a user to perform print setting operations thereon. In particular, in the present example, on a print setup screen for printing data of a predetermined file format, a user is allowed to choose how to define a layout of objects based on what kind of standards (the later-mentioned options of "give priority to reproducibility", "give priority to readability", "give priority to page reduction", and "with additional information").

The print section 14 includes constitutional elements (print engine) necessary for image formation using image creating processes such as an electro-photographic system and an electrostatic recording system, and is configured to print images based on image data created by the rasterizing section on a specified-type sheet.

The input I/F section 15 is a section configured to receive printing data from the external input device 20. In the case where the external input device 20 is a computing device, a mobile terminal, or a smartphone, the input I/F section 15 can be a NIC (Network Interface Card), a modem, etc., and, in the case where the external input device 20 is recording media, such as a USB (Universal Serial Bus) memory, the external input device 20 can be a USB port.

Here, FIG. 1 illustrates one example of the image forming apparatus 10 of the present example. The constitution of the image forming apparatus 10 may be modified appropriately as long as the modified constitution can perform direct printing. Further, in FIG. 1, the image forming apparatus 10 is configured to execute the printing process. However, the image forming apparatus 10 may be a control device, such as a print controller and a RIP (Raster Image Processing) controller, configured to instruct a printing device equipped with the print section 14 about printing. In such the case, a control section of the control device may be configured to execute the above print control program.

Hereafter, an outline of a direct printing process of the image forming apparatus 10 with the above-mentioned constitution will be described. The CPU 11a develops a print control program memorized in the ROM 11b or the storage section 12 into RAM 11c and executes the program, thereby performing processes illustrated in the schematic diagram of FIG. 2 and the flowchart of in FIG. 3.

First, the control section (data receiving section) 11 of the image forming apparatus 10 acquires (receives) printing data as input data described in PDL through the input I/F section 15, and saves them as spool data in the RAM 11c or the storage section 12 (S101). Next, the control section (analyzing section) 11 determines the file format of the printing data, operates the display and operation section 13 (as a display section) to display a print setup screen corresponding to the file format of the printing data, and acquires the print setting or print settings set on the print setup screen (S102). Then, the control section (analyzing section) 11 reads out the saved printing data, converts the printing data into descriptions of an intermediate language by analyzing the command of PDL to creates a display list, and saves the display list in the RAM 11c or the storage section 12 (S103). When the display list corresponding in amount to one page has been accomplished, the control section 11 (rasterizing section) reads out the display list, rasterizes it so as to create bitmap data divided in bands, and saves the bitmap data in the RAM 11c or the storage section 12 (S104). Then, when the bitmap data corresponding in amount to one page have been accomplished, the print section 14 reads out the bitmap data sequentially in units of a band, and performs a print job (S105). Hereafter, respective steps are described in detail.

Figure 3:
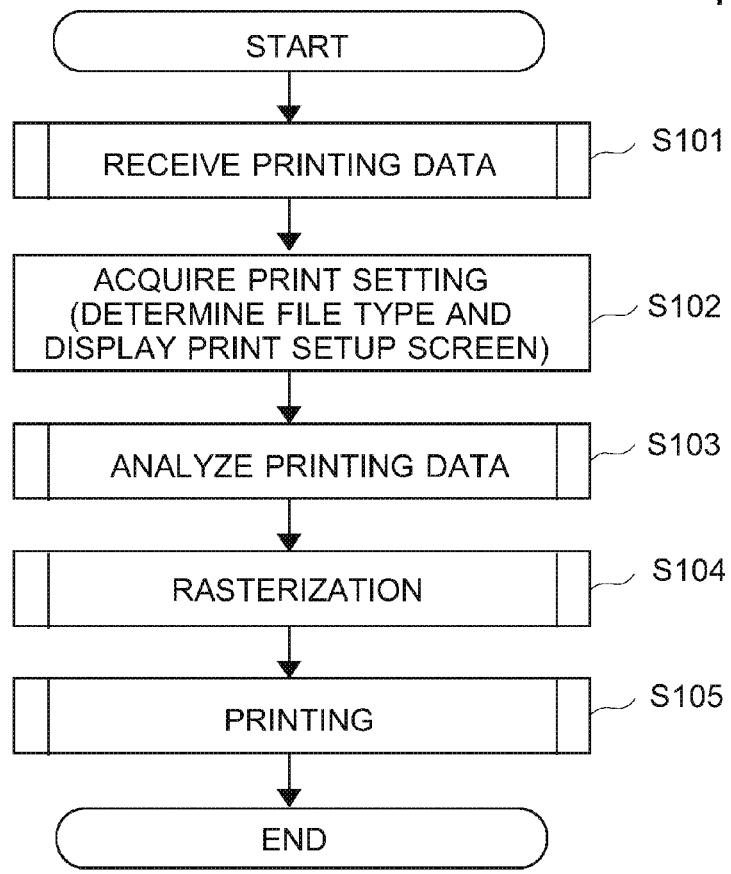
FIG. 3 is a flowchart of a direct printing process of the image forming apparatus according to one embodiment of the present invention.
Figure 4:
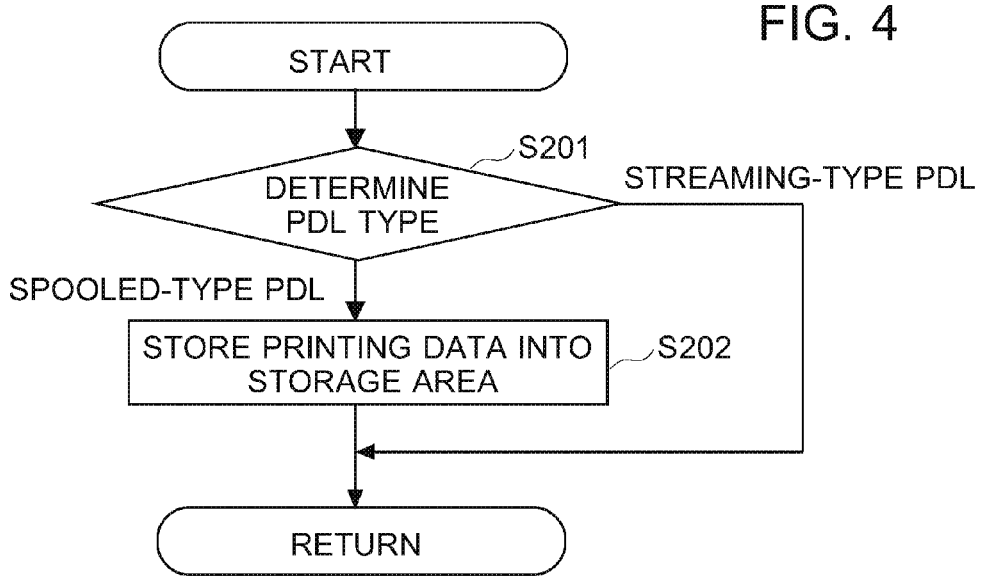
FIG. 4 illustrates a flowchart of a direct printing process (process of receiving printing data) of the image forming apparatus according to one embodiment of the present invention.

Process of Receiving Printing Data:

FIG. 4 illustrates the process of acquiring (receiving) printing data at S101 in FIG. 3. The CPU 11a develops the print control program memorized in the ROM 11b or the storage section 12 into RAM 11c and executes the program, thereby performing processes illustrated in the flowchart of FIG. 4. First, the data receiving section determines the type of PDL (print data language) of the received printing data (S201). In the case where the printing data are of a streaming-type PDL like Postscript or PCL (Printer Control Language), since the printing data are analyzed sequentially in the order from its head, it is not necessary to save the whole data in a storage region. Therefore, the data receiving section stores the printing data in the RAM 11c such that the analyzing section can process them immediately. On the other hand, in the case where the printing data are of a spooled-type PDL like PDF, XPS, OOXML, and ODF, since it is not necessarily guaranteed that the printing data can be analyzed sequentially from the head of the data, the data receiving section stores the whole data in the RAM 11e or the storage section 12 (S202).

Process of Acquiring Print Setting:

In the process of acquiring print setting or print settings at S102 in FIG. 3, the analyzing section determines the file format of the printing data based on the extension code of the acquired printing data, and operates the display and operation section 13 (the display section) to display a print setup screen corresponding to the file format of the printing data (for example, a print setup screen depending on whether the file format of the printing data is a predetermined file format or not). FIG. 10 illustrates an example of the display and operation section 13 (operation panel), and FIG. 11 illustrates an example of a print setup screen 30 displayed in the case where the printing data have one of predetermined file formats (OOXML, ODF, etc.). Then, the analyzing section acquires print setting set on the print setup screen.

In the case the printing data have one of predetermined file formats, the display and operation section 13 (the display section) may display at least a print setup screen different from the print setup screen displayed in the case where printing data have a usual file format (file format other than the predetermined file formats). For example, in that case, the display and operation section 13 (the display section) may display a print setup screen for print settings common to both a usual file format and the predetermined file format. The common print settings (for example, a sheet size, the orientation of a sheet, etc.) may be set each time when direct printing is instructed, or the common print settings set beforehand as default settings may be also used. Further, in the case where printing data saved in a USB memory are subjected to direct printing, the print settings may be set when the USB memory is connected to the image forming apparatus 10 and then printing data are selected, a print setting may be made. Furthermore, when printing data are received from an external device such as a computing device, a server, etc., print settings attached to the printing data may be used.

Options of the print setting which can be chosen on the print setup screen 30 displayed in the case where printing data has a predetermined file format are those for specifying how to define the layout of objects based on what kind of standards. The available standards include two or more options selected from "give priority to reproducibility", "give priority to readability", "give priority to page reduction (give priority to reduction of the number of pages)", and "with additional information (print with additional information)".

The option "give priority to reproducibility" can be selected in the case of reproducing a layout faithful to input printing data. For example, this option makes objects printed with the same layout as that at the time the objects are displayed on a screen by using one of applications contained in the office suite of Microsoft Corporation. In concrete terms, when a sheet size has been changed in an instruction about direct printing, the object size is enlarged or reduced in accordance with the change ratio of the sheet size so that the same layout as that in the original printing data is realized in the direct printing.

The option "give priority to readability" can be selected in the case where, for a print setting, such as a sheet size and an orientation of a sheet, the layout of objects should be defined and printed such that a document to be printed based on printing data is made legible. In concrete terms, when a sheet size has been made larger in an instruction about direct printing, the object size is enlarged in accordance with the change ratio of the sheet size, and when a sheet size has been made smaller in an instruction about direct printing, the layout is changed without changing the object size (maintaining the object size), whereby the readability is maintained.

The option "give priority to page reduction" can be selected in the case where the layout of objects is should be defined and printed so as to reduce the number of pages of a document to be printed based on the printing data. In concrete terms, when a sheet size has been made smaller in an instruction about direct printing, the object size is reduced in accordance with the change ratio of the sheet size, and when a sheet size has been made larger in an instruction about direct printing, the object size is not changed (the object size is maintained), whereby the number of pages is reduced. Further, the property of a file is changed so as to minimize the width of a frame (called as the size of a margin) at a periphery of a sheet where objects are not printed, so that a page is filled with objects and the number of pages is reduced. Furthermore, a setting to provide decoration settings of objects is made invalid (turned off) so as to reduce an area occupied by the objects, whereby the number of pages is reduced. Moreover, in the case where a page contains a figure, a picture together with characters (text), a setting (called as a text-wrap setting) as to how to arrange characters on or around the figure and image is changed to a setting to make superfluous spaces smaller, whereby the number of pages is reduced.

The option "with additional information" can be selected in the case where printing should be performed by using additional information, such as a comment and a change history. In concrete terms, the property of a file is changed so as to enable a comment and a change history to be printed. Further, when a sheet size has been changed in an instruction about direct printing, the object size is enlarged or reduced in accordance with the change ratio of the sheet size, and the comments and the change histories are added to the printed result while realizing the same layout as the original printing data.

In the present example, as print setting options, four options of "give priority to reproducibility", "give priority to readability", "give priority to page reduction", and "with additional information" are exemplified. However, it may be permissible for the print setting options to merely specify how to define the layout of objects based on what kind of standards, and the print setting options should not be limited to the above four options.

Figure 5:
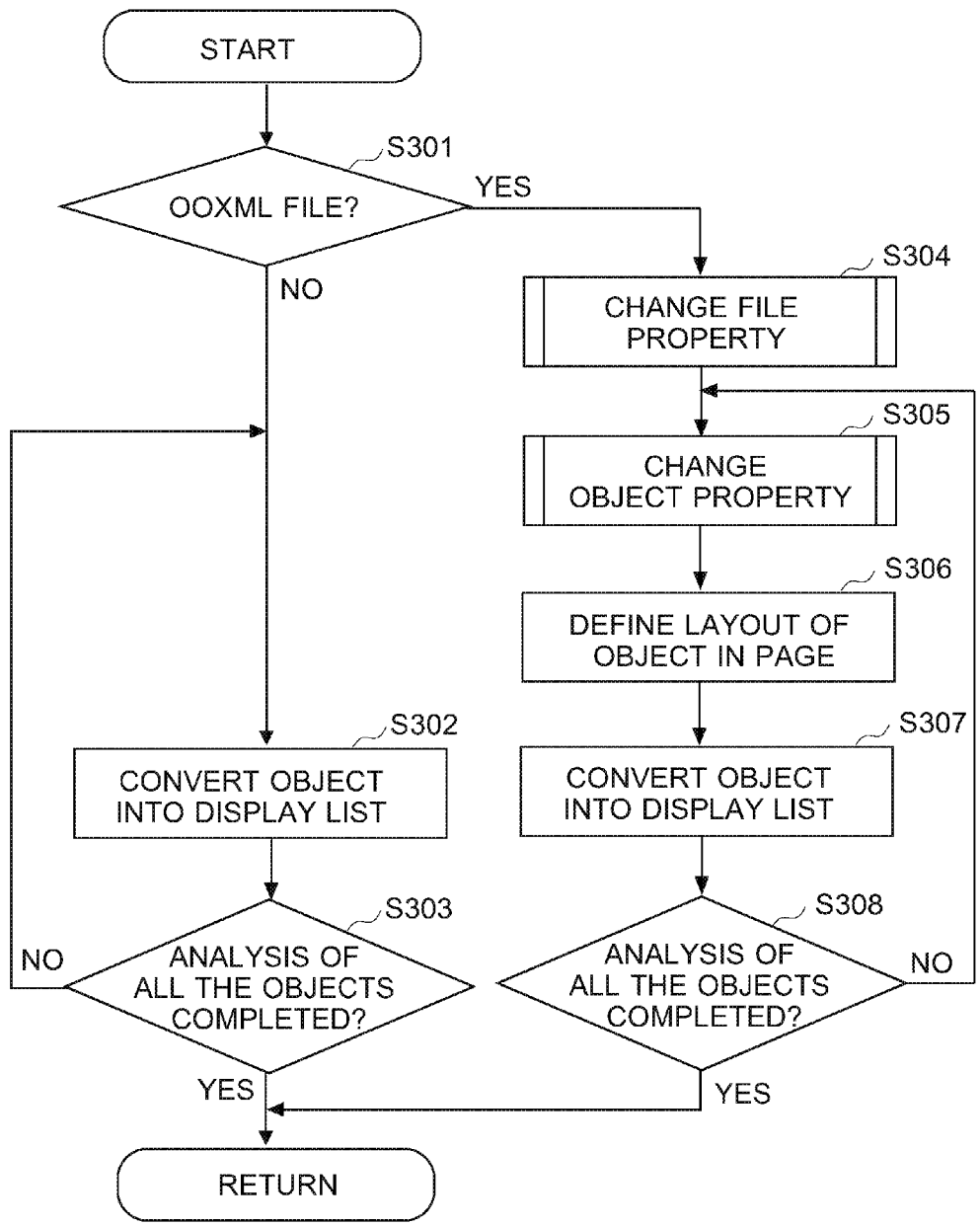
FIG. 5 illustrates a flowchart of a direct printing process (process of analyzing printing data) of the image forming apparatus according to the one embodiment of the present invention.

Process of Analyzing Printing Data:

FIG. 5 illustrates the detail of the process of analyzing printing data at S103 in FIG. 3. The CPU 11a develops the print control program memorized in the ROM 11b or the storage section 12 into RAM 11c and executes the program, thereby performing processes illustrated in the flowchart of FIG. 5. First, the analyzing section determines whether the acquired printing data are data of a predetermined file format (here, an OOXML file) (S301). In the case of the OOXML file, the analyzing section changes the property of the file in accordance with the print setting or print settings acquired at S102 (S304), and changes the property of each object (S305). The detail of the process of changing the file property and the process of changing the object property is described later. Next, the analyzing section arranges the objects obtained after the changing of the properties onto a page so as to determine coordinates of the objects (S306), and converts them into a display list (S307). Then, the processes from S305 to S307 are repeated until the analyzing of all the objects has been completed (S308).

On the other hand, in the case where the printing data are data (for example, PDF and XPS file) other than the OOXML file, since coordinates to arrange the objects to be printed are specified with the printing data, the objects are converted into a display list without performing the process of defining the layout (S302). Then, this process is repeated until the analyzing of all the objects has been completed (S303).

Figure 6:
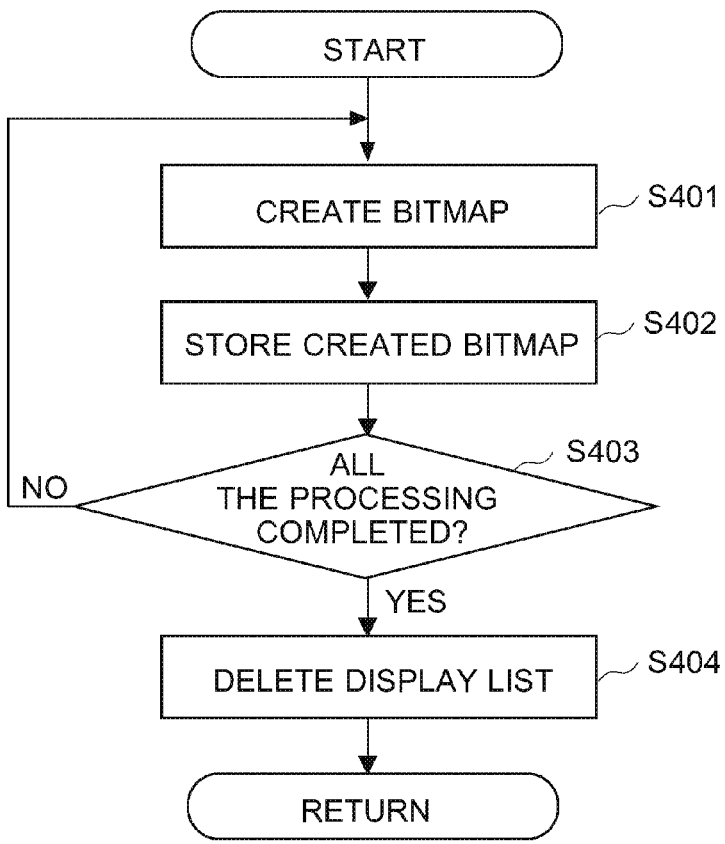
FIG. 6 illustrates a flowchart of a direct printing process (rasterization process) of the image forming apparatus according to the one embodiment of the present invention.

Rasterization Process:

FIG. 6 illustrates the detail of a rasterization process at S104 in FIG. 3. The CPU 11a develops the print control program memorized in the ROM 11b or the storage section 12 into RAM 11c and executes the program, thereby performing processes illustrated in the flowchart of FIG. 6. First, a rasterizing section reads out a display list from the RAM 11c or the storage section 12, creates bitmap data (print image) in a band size (S401), and saves the created bitmap data in the RAM 11c (S402). At this time, the bitmap data is saved with a compressed state. However, when the volume of the bitmap data is too large be saved in the RAM 11c even if the bitmap data is compressed, the bitmap data is saved in the storage section 12. Then, the rasterizing section repeats the process in units of a band until the process corresponding to one page has been completed (S403). Subsequently, after the process has been completed, the rasterizing section deletes the corresponding display list from the RAM 11c or the storage section 12 (S404).

Figure 7:
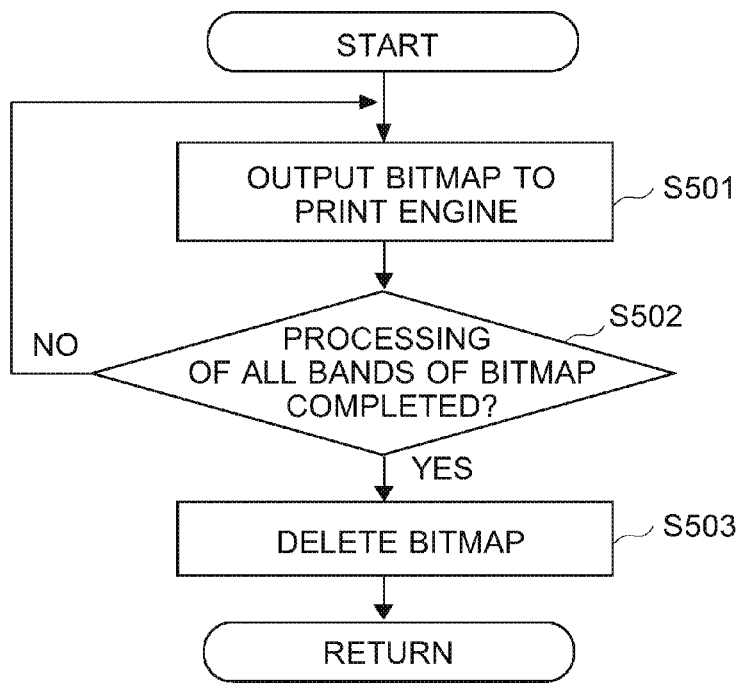
FIG. 7 illustrates a flowchart of a direct printing process (printing process) of the image forming apparatus according to the one embodiment of the present invention.

Printing Process:

FIG. 7 illustrates the detail of a printing process at S105 in FIG. 3. The CPU 11a develops the print control program memorized in the ROM 11b or the storage section 12 into RAM 11*c* and executes the program, thereby performing processes illustrated in the flowchart of FIG. 7. First, a print section reads out bitmap data in units of a band from the RAM 11*c* or the storage section 12, and transfers the bitmap data to a print engine (S501). The print section repeats this process until the transferring of data corresponding to one page has been completed (S502). With this, the printing to a sheet is completed. Subsequently, after the process corresponding to one page has been completed, the print section deletes the bitmap data of the corresponding page from the RAM 11*c* or the storage section 12 (S503).

Figure 8:
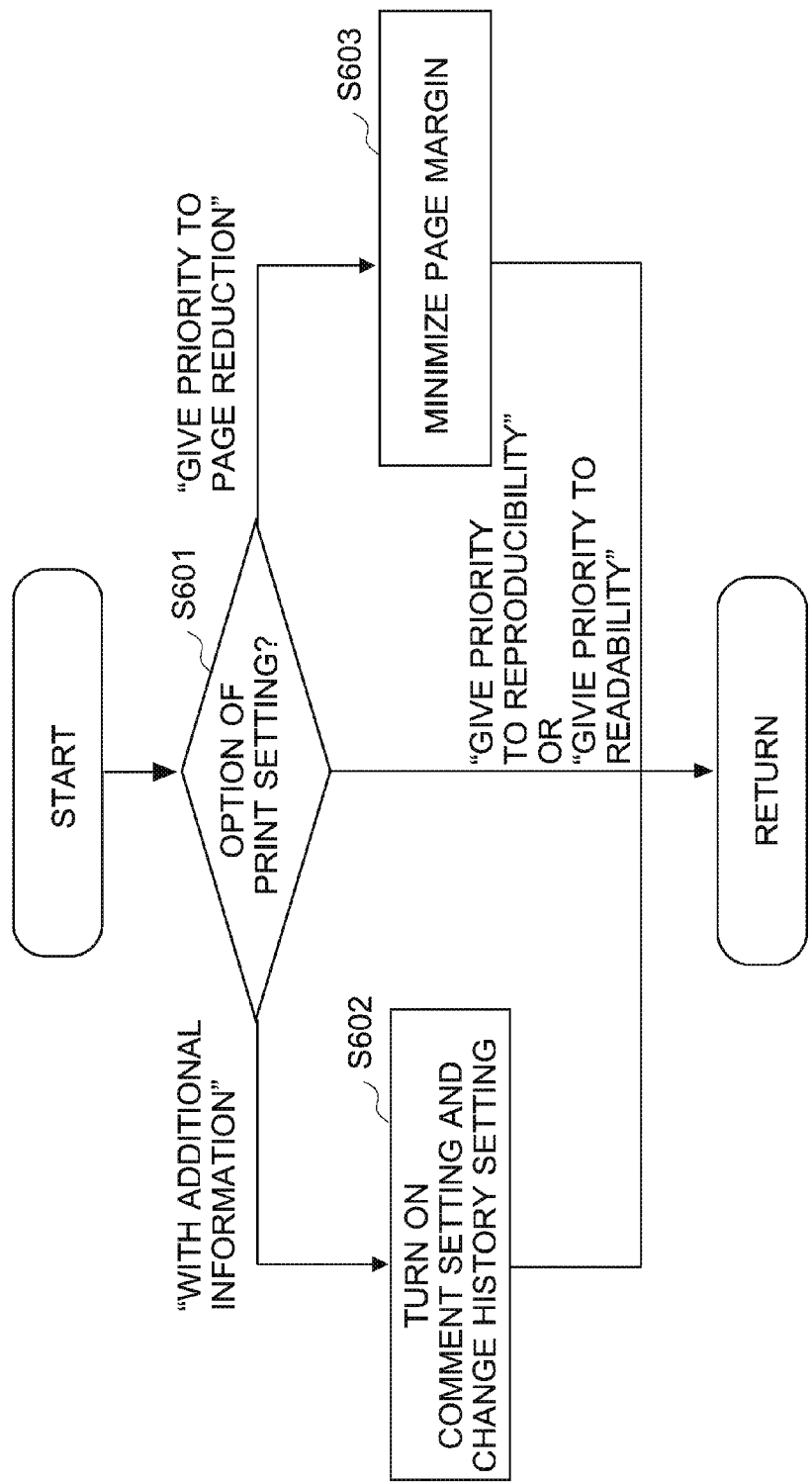
FIG. 8 illustrates a flowchart of a direct printing process (process of changing file property in the process of analyzing printing data) of the image forming apparatus according to the one embodiment of the present invention.

Process of Changing File Property:

FIG. 8 illustrates the detail of the process of changing the file property at S304 in FIG. 5. The CPU 11*a* develops the print control program memorized in the ROM 11*b* or the storage section 12 into RAM 11*c* and executes the program, thereby performing processes illustrated in the flowchart of FIG. 8. First, an analyzing section determines an option of a print setting (chosen standard) specified on the print setup screen 30 (S601). In the case where the chosen option of the print setting is "give priority to reproducibility" or "give priority to readability", the file property is not changed. Further, in the case where the chosen option of the print setting is "give priority to page reduction", the analyzing section changes the file property such that a page margin becomes the minimum (for example, the value of a page margin described in printing data is changed into the minimum value) (S603). Although the minimum value of this page margin may depend on the image forming apparatus 10, a margin at each of top, bottom, left, and, right is assumed to be set to 4 mm in the present example. Furthermore, in the case where the chosen option of the print setting is "with additional information", the analyzing section changes a file property such that additional information such as comments and change histories is enabled to be additionally printed (for example, a setting as to whether to print additional information described in printing data is turned ON) (S602).

Process of Changing Object Property:

FIGS. 9A and 9B illustrate the detail of the process of changing object property at S305 in FIG. 5. The CPU 11*a* develops the print control program memorized in the ROM 11*b* or the storage section 12 into RAM 11*c* and executes the program, thereby performing processes illustrated in the flowchart of FIGS. 9A and 9B. First, the analyzing section determines an option of the print setting (chosen standard) specified on the print setup screen 30 (S701). In the case where the chosen option of the print setting is "give priority to reproducibility" or "with additional information", the analyzing section checks whether a sheet size specified in the printing data (written in the printing data) differs from a sheet size specified by the print settings (set beforehand as default or set on a print setup screen) (S702). When the sheet sizes differ from each other, the analyzing section enlarges or reduces the object size in accordance with the change ratio in the sheet size such that the objects are printed in the same layout with the original printing data (S703).

In the case where the chosen option of the print setting is "give priority to readability", the analyzing section checks whether a sheet size specified in the printing data differs from a sheet size specified by the print settings (S704). When the sheet sizes differ from each other and when the sheet size specified by the print setting is larger, the analyzing section enlarges the object size in accordance with the change ratio in the sheet size. Further, when the sheet size specified by the print setting is smaller, the analyzing section does not change (maintains) the object size in order to maintain the readability (S705).

In the case where the chosen option of the print setting is "give priority to page reduction", the analyzing section checks whether a sheet size specified in the printing data differs from a sheet size specified by the print settings (S706). When the sheet sizes differ from each other and when the sheet size specified by the print setting is larger, the analyzing section does not change (maintains) the object size in order to reduce the number of pages (that is, reduces a ratio of the object size to the sheet size). Further, when the sheet size specified by the print setting is smaller, the analyzing section reduces the object size in accordance with the change ratio in the sheet size (S706).

Next, the analyzing section determines whether decoration settings are set for the objects (S708). When decoration settings are set for a certain object (for example, "3D rotation" to make it possible to rotate a picture (image object) in three dimensions), the decoration setting is made invalid (turned OFF) in order to enable a space to be used effectively by reducing a region occupied by the object (S709). Here, the decoration setting should not be limited to "3D rotation".

Next, the analyzing section determines whether there is a text-wrap setting in the case where a figure (graphics object), picture (image object), and characters (text object) are mixed in a page (S710). When there is the text-wrap setting, the setting is changed to a setting to enlarge a display region for the characters (S711). FIG. 12 illustrates an example of a layout option screen used to define the layout of objects. For example, the layout option screen is indicated after printing data have been received. On this layout option screen, a user can set whether to arrange a figure or picture in a line of characters, and/or to set the way to wrap text around the figure or picture. Then, for example, in the case of a setting not to arrange characters in a rectangle region enclosing a figure or a picture (a setting indicated with an icon positioned at the left end of the options of "WITH TEXT WRAPPING" in FIG. 12), or in the case of a setting not to arrange characters in a line where a figure or a picture is arranged (a setting indicated with the fourth icon from the left of the options of "WITH TEXT WRAPPING" in FIG. 12), the above settings are changed as follows, in order to use a space effectively. That is, the above setting is changed to a setting to arrange characters up to an outer periphery of the figure or the picture (a setting indicated with the second icon from the left of the options of "WITH TEXT WRAPPING" in FIG. 12), a setting to further arrange characters also inside of the area of the figure or the picture (a setting indicated with the third icon from the left of the options of "WITH TEXT WRAPPING" in FIG. 12), or a setting to arrange characters so as to be overlapped with the figure or the picture (a setting indicated with the fifth or sixth icon from the left of the options of "WITH TEXT WRAPPING" in FIG. 12).

Hereafter, with reference to specific examples, description is given to a print result in the case where the layout for printing data of a predetermined file format has been changed in accordance with the chosen standard. FIGS. 13A and 13B illustrate an example of an original printing data. FIGS. 14A and 14B illustrate an example of a print result in the case that "give priority to reproducibility" has been set on the print setup screen 30 and the sheet size has not been changed from that specified in the printing data ("A4" size in this case). FIGS. 14C and 14D illustrate an example of a print result in the case that "give priority to reproducibility" has been set on the print setup screen 30 and the sheet size has been changed from that specified in the printing data to "B5" size. FIGS. 15A to 15C illustrate an example of a print result in the case that "give priority to readability" has been set on the print setup screen 30 and the sheet size has been changed from that specified in the printing data to "B5" size. It is supposed that, in the original data, as illustrated in FIGS. 13A and 13B, figures, pictures, and characters are arranged on two pages of sheets in "A4" size. Further, it is supposed that "3D rotation" is set as a decoration setting for a photograph 40 indicated on the first page illustrated in FIG. 13A. Furthermore, it is supposed that the printing data has been set such that a predetermined margin (a margin larger than the smallest margin) is provided at the top, bottom, left and right of a sheet, a line of characters is wrapped to (continues on) the next line at the end of a sentence, and a word is not broken across lines when a line continues on a new line in the middle of a sentence.

When the option "give priority to reproducibility" has been chosen for the printing data illustrated in FIGS. 13A and 13B on the print setup screen 30, if the sheet size specified in the printing data has not been changed (NO at S702 in FIG. 9A) as illustrated in FIG. 14A, the same print result as the original printing data can be obtained. On the other hand, if the sheet size has been changed (YES at S702 in FIG. 9A), the object size is enlarged or reduced in accordance with the change ratio in the sheet size (S703 in FIG. 9A). For example, when the sheet size is reduced from "A4" to "B5", since each object is reduced in accordance with the change ratio in the sheet size, as illustrated in FIGS. 14C and 14D, the print result is obtained such that the whole page is reduced.

When the option "give priority to readability" has been chosen for the printing data illustrated in FIGS. 13A and 13B on the print setup screen 30, if the sheet size specified in the printing data has not been changed (NO at S704 in FIG. 9A), the same print result as the original printing data can be obtained. On the other hand, if the sheet size has been enlarged (YES at S704 in FIG. 9A), the object size is enlarged in accordance with the change ratio in the sheet size (S705 in FIG. 9A).

Alternatively, if the sheet size has been reduced (YES at S704 in FIG. 9A), the object size is not changed (maintained) in order to maintain the readability (S705 in FIG. 9A). Accordingly, depending on the constitution of the objects, the number of pages may increase. For example, as illustrated in FIGS. 15A to 15C, when the sheet size has is changed from "A4" into "B5", since the size of a figure or a picture and the point number of characters are still kept as those in the original printing data, the number of pages may increase from 2 pages to 3 pages.

At this time, since the sheet size becomes small, the number of characters capable of being described in each line becomes small, so that a line-break position changes. However, in order to maintain the readability, it is preferable to set a line-break position such that a word is not broken across lines. Further, in a portion where a figure, a picture, and characters (text) are mixed together (in the block of "Mobile functions" on the first page in the original printing data illustrated in FIG. 13A), because of the reduced sheet size, the number of characters capable of being described in a line on which a figure or a picture is arranged, becomes small, and the sentence becomes difficult to be read. In the above case, as illustrated in a layout-changed region 41 enclosed with a broken line in FIG. 15B, the layout may be changed such that the figure or the picture is arranged after the text. In this way, even if the sheet size becomes small, the readability can be maintained by adjusting a layout.

When the option "give priority to page reduction" has been chosen for the printing data illustrated in FIGS. 13A and 13B on the print setup screen 30, in order to reduce the number of pages, a file property is changed such that a page margin is minimized (S603 in FIG. 8). Further, in order to reduce the number of pages, if the sheet size has been changed larger, an object size is not changed. On the other hand, if the sheet size has been changed smaller, an object size is reduced in accordance with the change ratio in the sheet size (YES at S706 and S707 in FIG. 9A). Further, in the original printing data, although "3D rotation" is set as a decoration settings for a photograph 40 (YES at S708 in FIG. 9B), in order to reduce the number of pages, the setting of "3D rotation" has been changed to invalid (turned off) (S709 in FIG. 9B). Furthermore, in the original printing data, at the block of "Compact and stylish design" on the first page, a text-wrap setting has been made to a setting not to arrange characters in a line on which a figure or a picture is arranged. However, in order to use a space effectively, the text-wrap setting is changed to a setting to arrange characters up to an outer periphery of the figure or the picture.

FIG. 16 illustrates a print result in the case where "priority to page reduction" has been chosen on the print setup screen 30. In this example, in order to reduce the number of pages, a page margin is made to the smallest. Further, as illustrated in a layout-changed region 42 enclosed with a broken line in FIG. 16, the setting of "3D rotation" for a photography 40 is changed to invalid, and the area occupied by the photography 40 becomes small. Furthermore, a text-wrap setting is changed to a setting to arrange characters up to an outer periphery of the figure or the picture, and characters are arranged up to an outer periphery of the photography 40. In addition, a line is not wrapped to the next line at the end of a sentence, and a line is wrapped to the next line even in the middle of a word. As a result, the print result is made such that the number of pages is reduced from 2 pages to 1 page. Here, with regard to "3D rotation", in FIG. 13A to FIG. 15C, the photograph 40 of a MFP is made a picture viewed obliquely from the right side (a picture in which the front and the right side of the MFP can be observed), and in FIG. 16, the photograph 40 of the MFP is made a picture viewed from the front side (a picture in which only the front of the MFP can be observed). However, a change of a picture due to the 3D rotation should not be limited to the above examples. For example, in the function of "3D rotation" in applications contained in the office software suite of Microsoft Corporation, an object is treated together with a right side view as a piece of picture. If the object is rotated horizontally to the right, a result becomes like that the picture becomes thin while the right side of the MFP is still shown, and an area occupied by the picture becomes small in the longitudinal direction and in the transverse direction. Therefore, even if the function of such a "3D rotation" is applied, the number of pages can be reduced.

When the option "with additional information" has been chosen for the printing data illustrated in FIGS. 13A and 13B on the print setup screen 30, a file property is changed such that comments and change histories are additionally printed (S602 in FIG. 8). Further, if the sheet size is changed (YES at S702 in FIG. 9A), the object size is enlarged or reduced in accordance with a change ratio in the sheet size (S703 in FIG. 9A). FIGS. 17A and 17B illustrates a print result in the case where the option "with additional information" has been chosen on the print setup screen 30. In this example, since a print setting for comments has been made valid, comments 43 are printed at the right side on a page.

As described in the above, in the present example, the control section (print control program) determines whether printing data are data of a predetermined file format (OOXML file etc.). In the case where the printing data are data of a predetermined file format, the print setup screen 30 is displayed as illustrated in FIG. 11, whereby a user is allowed to choose which standard to be used for defining the layout. Then, the layout of objects is changed in accordance with the standard chosen by the user. Accordingly, in the case where printing data of a predetermined file format are subjected to direct printing, the print result intended by the user can be obtained without previewing a print result.

Here, the present invention should not be limited to the above-mentioned embodiments and examples, because the constitutions and the method of print control can be modified appropriately unless the modification deviates from the intention of the present invention.

For example, in each of the above-mentioned examples, as a predetermined file format, OOXML and ODF are exemplified. However, the predetermined file format may be a file format in which the arrangement of each object is not specified because of the specification of the file format.

Further, in each of the above-mentioned examples, when the option "give priority to readability" has been chosen on the print setup screen 30, only changing an object size is performed as an object property changing process. However, for example, in the case where a text-wrap setting has been set at one of a setting to arrange characters up to an outer periphery of a figure or a picture, a setting to arrange characters also in the inside of the area of a figure or a picture, or a setting to arrange characters so as to be overlapped with a figure or a picture, the setting may be changed to a setting not to arrange characters in a rectangle region enclosing a figure or a picture and/or to a setting not to arrange characters in a line on which a figure or a picture is arranged so as to make it easier to read.

Furthermore, in each of the above-mentioned examples, in the case where the option "give priority to page reduction" has been chosen on the print setup screen 30, when the sheet size is changed larger, the setting is made such that the object size is not changed. However, for example, even when the sheet size is changed larger, the object size may be reduced at a predetermined ratio so as to reduce the number of pages more.

The invention claimed is:

1. An image forming apparatus which can directly print printing data described in a page description language, comprising:
a display section;
a data receiving section configured to receive the printing data;
an analyzing section configured to
analyze the printing data to determine a file format of the printing data,
operate the display section to display a print setup screen thereon, the print setup screen depending on whether the printing data has a predetermined file format or not,
define a layout of objects in each page to be printed from the printing data, according to a print setting or print settings set on the print setup screen, and
convert the printing data into descriptions of an intermediate language, based on the layout; and
a rasterizing section configured to rasterize the descriptions of the intermediate language to create an image to be printed,
wherein the analyzing section is configured to, on the printing data having the predetermined file format, operate the display section to display a predetermined print setup screen allowing a user to choose a standard to be used in the analyzing section defining the layout of the objects in each page, and
wherein the predetermined print setup screen allows thereon a user to choose the standard from a group at least including
a first standard for defining the layout of the objects with giving priority to readability of a document to be printed from the printing data, and
a second standard for defining the layout of the objects with giving priority to reduction of the number of pages of a document to be printed from the printing data, and
the analyzing section is configured to, on the first standard or the second standard being chosen, define the layout of the objects in each page with giving the priority chosen on the predetermined print setup screen,
wherein the analyzing section is configured to,
on a condition that the second standard has been chosen and printing the printing data on a sheet or sheets being larger in size than a sheet or sheets specified by the printing data, maintain a size of each of the objects as specified by the printing data, and
on a condition that the second standard has been chosen and printing the printing data on a sheet or sheets being smaller in size than a sheet or sheets specified by the printing data has been instructed, reduce a size of each of objects according to a change ratio in sheet size,
wherein the analyzing section is configured to, on a condition that the second standard has been chosen, a page to be printed includes a figure or a picture together with characters and a text-wrap setting has been set at an option that no characters are arranged in a line including the figure or the picture, or an option that no characters are arranged inside a rectangle frame enclosing the figure or the picture, change the text-wrap setting to an option to arrange the characters up to an outer periphery of the figure or the picture.

2. The image forming apparatus of claim 1,
wherein the analyzing section is configured to,
on a condition that the first standard has been chosen and printing the printing data on a sheet or sheets being smaller in size than a sheet or sheets specified by the printing data has been instructed, maintain a size of each of the objects as specified by the printing data, and
on a condition that the first standard has been chosen and printing the printing data on a sheet or sheets being larger in size than a sheet or sheets specified by the printing data has been instructed, enlarge a size of each of the objects according to a change ratio in sheet size.

3. The image forming apparatus of claim 1,
wherein the predetermined file format is a file format by which the layout of the objects in each page is not specified.

4. The image forming apparatus of claim 3,
wherein the predetermined file format is one of Office Open XML and OpenDocument Format.

5. A non-transitory computer-readable storage medium storing a print control program to be executed in an apparatus configured to directly print printing data described in a page description language or to send another apparatus an instruction to directly print the printing data, the control program, when being executed by a processor of the apparatus, causing the processor to perform processes comprising:
in response to the printing data being received, analyzing the printing data to determine a file format of the printing data;
operating a display section of the apparatus to display a print setup screen thereon, the print setup screen depending on whether the printing data has a predetermined file format or not; and
defining a layout of objects in each page to be printed from the printing data, according to a print setting or print settings set on the print setup screen, wherein the operating the display section to display the print setup screen includes, on the printing data having the predetermined file format, operating the display section to display a predetermined print setup screen allowing a user to choose a standard to be used in the defining the layout of the objects in each page, and wherein the operating the display section to display the print setup screen includes allowing the user through the predetermined print setup screen to choose the standard from a group at least including a first standard for defining the layout of the objects with giving priority to readability of a document to be printed from the printing data, and a second standard for defining the layout of the objects with giving priority to reduction of a number of pages of a document to be printed from the printing data, and the defining the layout of the objects in each page includes, on the first standard or the second standard being chosen, defining the layout of the objects in each page with giving the priority chosen on the predetermined print setup screen, wherein the defining the layout of the objects includes, on a condition that the second standard has been chosen and printing the printing data on a sheet or sheets being larger in size than a sheet or sheets specified by the printing data, maintaining a size of each of the objects as specified by the printing data, and on a condition that the second standard has been chosen and printing the printing data on a sheet or sheets being smaller in size than a sheet or sheets specified by the printing data has been instructed, reducing a size of each of objects according to a change ratio in sheet size, wherein the defining the layout of the objects includes, on a condition that the second standard has been chosen, a page to be printed includes a figure or a picture together with characters and a text-wrap setting has been set at an option that no characters are arranged in a line including the figure or the picture, or an option that no characters are arranged inside a rectangle frame enclosing the figure or the picture, changing the text-wrap setting to an option to arrange the characters up to an outer periphery of the figure or the picture.

6. The non-transitory computer-readable storage medium of claim 5, wherein the defining the layout of the objects includes, on a condition that the first standard has been chosen and printing the printing data on a sheet or sheets being smaller in size than a sheet or sheets specified by the printing data has been instructed, maintaining a size of each of the objects as specified by the printing data, and on a condition that the first standard has been chosen and printing the printing data on a sheet or sheets being larger in size than a sheet or sheets specified by the printing data has been instructed, enlarging a size of each of the objects according to a change ratio in sheet size.

7. The non-transitory computer-readable storage medium of claim 5, wherein the predetermined file format is a file format by which the layout of the objects in each page is not specified.

8. The non-transitory computer-readable storage medium of claim 7, wherein the predetermined file format is one of Office Open XML and OpenDocument Format.

9. A print control method of an apparatus configured to directly print printing data described in a page description language or to send another apparatus an instruction to directly print the printing data, the method comprising:

receiving the printing data;

analyzing the printing data to determine a file format of the printing data;

operating the display section to display a print setup screen thereon, the print setup screen depending on whether the printing data has a predetermined file format or not;

defining a layout of objects in each page to be printed from the printing data, according to a print setting or print settings set on the print setup screen; and converting the printing data into descriptions of an intermediate language, based on the layout; and rasterizing the descriptions of the intermediate language to create an image to be printed, wherein the operating the display section to display the print setup screen includes, on the printing data having the predetermined file format, operating the display section to display a predetermined print setup screen allowing a user to choose a standard to be used in the defining the layout of the objects in each page, and wherein the operating the display section to display the print setup screen includes allowing the user through the predetermined print setup screen to choose the standard from a group at least including a first standard for defining the layout of the objects with giving priority to readability of a document to be printed from the printing data, and a second standard for defining the layout of the objects with giving priority to reduction of a number of pages of a document to be printed from the printing data, and the defining the layout of the objects in each page includes, on the first standard or the second standard being chosen, defining the layout of the objects in each page with giving the priority chosen on the predetermined print setup screen, wherein the defining the layout of the objects includes, on a condition that the second standard has been chosen and printing the printing data on a sheet or sheets being larger in size than a sheet or sheets specified by the printing data, maintaining a size of each of the objects as specified by the printing data, and on a condition that the second standard has been chosen and printing the printing data on a sheet or sheets being smaller in size than a sheet or sheets specified by the printing data has been instructed, reducing a size of each of objects according to a change ratio in sheet size, wherein the defining the layout of the objects includes, on a condition that the second standard has been chosen, a page to be printed includes a figure or a picture together with characters and a text-wrap setting has been set at an option that no characters are arranged in a line including the figure or the picture, or an option that no characters are arranged inside a rectangle frame enclosing the figure or the picture, changing the text-wrap setting to an option to arrange the characters UP to an outer periphery of the figure or the picture.

10. The print control method of claim 9, wherein the defining the layout of the objects includes, on a condition that the first standard has been chosen and printing the printing data on a sheet or sheets being smaller in size than a sheet or sheets specified by the printing data has been instructed, maintaining a size of each of the objects as specified by the printing data, and on a condition that the first standard has been chosen and printing the printing data on a sheet or sheets being larger in size than a sheet or sheets specified by the printing data has been instructed, enlarging a size of each of the objects according to a change ratio in sheet size.

11. The print control method of claim 9, wherein the predetermined file format is a file format by which the layout of the objects in each page is not specified.

12. The print control method of claim 11, wherein the predetermined file format is one of Office Open XML and OpenDocument Format.

* * * * *